(12) United States Patent
Young

(10) Patent No.: US 6,382,696 B1
(45) Date of Patent: May 7, 2002

(54) WINDOW TRIM MOLDING

(75) Inventor: Jack D. Young, Dayton, OH (US)

(73) Assignee: Creative Extruded Products, Inc., Tipp City, OH (US)

( * ) Notice: Subject to any disclaimer, the term of this patent is extended or adjusted under 35 U.S.C. 154(b) by 0 days.

(21) Appl. No.: 09/922,537

(22) Filed: Aug. 6, 2001

(51) Int. Cl.[7] .................................................. B60J 1/00
(52) U.S. Cl. ................ 296/93; 296/146.15; 52/204.597; 264/241
(58) Field of Search ........................... 296/208, 93, 201, 296/146, 15; 52/208, 204, 591, 597

(56) References Cited

U.S. PATENT DOCUMENTS

| | | | | |
|---|---|---|---|---|
| 5,028,460 A | * | 7/1991 | Kimura et al. ............ | 296/93 X |
| 5,088,787 A | * | 2/1992 | Gross ........................... | 296/93 |
| 5,114,206 A | * | 5/1992 | Yada ........................ | 296/93 X |
| 5,358,764 A | * | 10/1994 | Roberts et al. ........... | 296/93 X |
| 5,624,148 A | * | 4/1997 | Young et al. .................. | 296/93 |
| 5,864,996 A | * | 2/1999 | Veldman et al. .......... | 296/93 X |

* cited by examiner

Primary Examiner—Joseph D. Pape
(74) Attorney, Agent, or Firm—Reuben Wolk

(57) ABSTRACT

A decorative molding for use around automotive vehicle moldings, capable of being bent around the corners of the window to fit tightly and minimize the corner radius required for the window. The molding is primarily composed of a thermoplastic vulcanite elastomeric material, and has a layer of a harder semi-rigid polyolefin elastomer at least partially embedded in the primary material. A thin metallic reinforcement has an adhesive coating and is embedded in the layer.

20 Claims, 2 Drawing Sheets

WINDOW TRIM MOLDING

BACKGROUND OF THE INVENTION

The present invention relates to a trim molding for automotive vehicle windows, particularly to the application of the molding to a fixed window, such as the rear window, the side windows, or the windshield. This molding is also referred to as "reveal molding" or "header lace". The molding is used to retain the window and to conceal the space between the edge of the window and the adjacent body panel. After fabrication, such moldings must be bent around the corners of the window and provide a proper fit at the corners, as well as along the straight sections of the window. The bent portion of the molding must retain its grip on the window and conceal the space, despite the strain imparted by the bending operation.

PRIOR ART STATEMENT

Trim moldings of this type are conventionally flexible and formed of an elastomeric material, such as polyvinyl chloride. An improvement over this conventional design is described in U.S. Pat. No. 5,624,148, issued to Young et al, of common assignment. In this patent, the primary material used is a soft polyvinyl chloride, and has a layer of a harder semi-rigid polyvinyl chloride material at least partially embedded in the primary material, and a metallic reinforcement is embedded within the layer so that the combination of the semi-rigid layer and the reinforcement enhances the ability of the molding to grip the window. The legs of the reinforcement which are approximately parallel to the window may be bent inwardly toward each other to further improve the gripping effect.

SUMMARY OF THE INVENTION

While the molding described in the above-referenced patent has been found to be of great commercial acceptance, there has been a general objection among environmentalists to the use of polyvinyl chlorides, because of the solvents used in their fabrication and to the degradation of the material after long use. Both of these situations tend to release harmful materials into the atmosphere, stimulating research efforts to find non-deleterious materials as a substitute. One of the products which is a subject of this research is the automotive window trim molding used in large quantities, and much effort has been expended to find such materials which will provide moldings that are at least as good as, or perhaps better than, the standard materials. The present application describes and claims such a result. The novel product utilizes a thermoplastic vulcanate having a hardness of about 60–80 Shore "A" as the principal material of the molding, and a layer of semi-rigid harder polyolefin material, having a hardness of about 60–70 Shore "D" at least partially embedded within the principal material. In addition, a reinforcement made of a thin sheet of aluminum, similar to the reinforcement described in the above-referenced patent, is coated with a suitable adhesive, formed in a generally U-shaped configuration, and embedded in the layer. The adhesive enhances the bonding of the reinforcement to the material of the layer. The combination of the semi-rigid layer and reinforcement provides an excellent grip of the window edge.

Accordingly, it is a principal object of this invention to provide a trim molding principally made of elastomeric material that can be bent around window corners, using a small radius.

It is another object to at least partially embed a semi-rigid layer of a dissimilar material within the principal material.

It is still another object to place a reinforcement which has been coated with an adhesive for improved bonding, within the semi-rigid layer of material.

These and other objects and features will become apparent from the embodiments described and shown herein.

DESCRIPTION OF A PREFERRED EMBODIMENT

Figure 1:
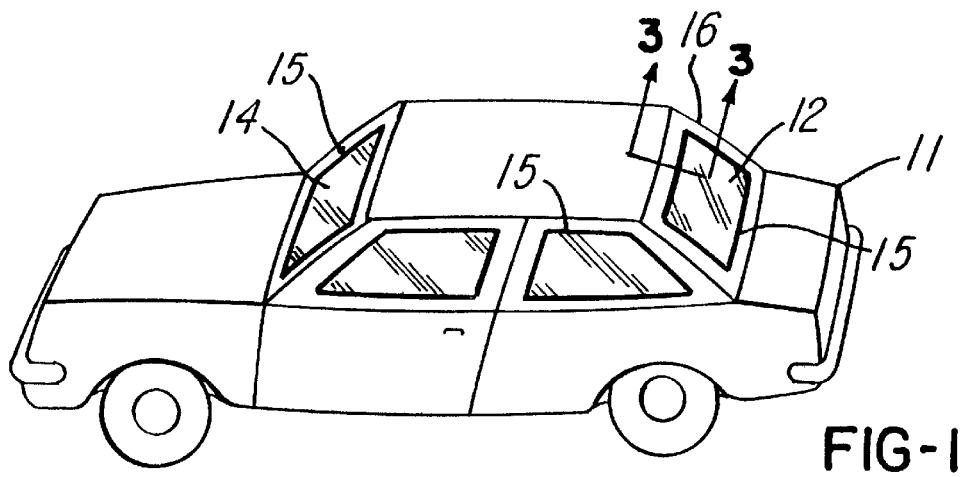
FIG. 1 is a perspective view of a typical automotive vehicle illustrating various locations of the novel molding.
Figure 2:
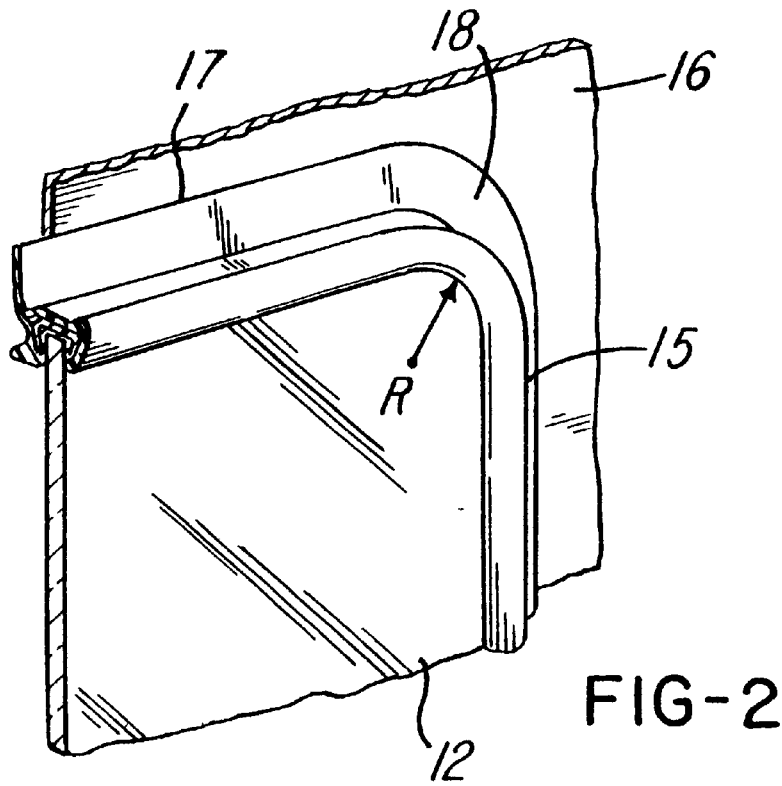
FIG. 2 is an enlarged detail of a typical corner portion of the molding installed at a corner of the window.

Referring to the drawings, the automobile 11 of FIG. 1 contains, among other parts, a body panel 16, a rear window 12, and a windshield 14. A flexible molding 15 is fabricated as a continuous strip for use around at least a portion of the extent of the windows and windshield. The window may be attached to the adjacent body panel by means of an adhesive (not shown) in a manner well-known in the art. The body panel may assume different configurations depending on the particular automobile design. The molding 15 fits completely around the rear window 12, including the corners, one of which is shown in FIG. 2. A similar arrangement is applicable to the side windows and the windshield. The outer portion 17 of the molding contacts the body panel 16 to conceal the space between the panel and the edge of the window. The molding is bent at area 18 to fit around the corner of the window, and the construction of the molding allows the bend to have a very small radius R, in the range of 5 to 12 millimeters. This configuration is bent by hand by the operator to provide a tight fit against the corner of the glass with a minimum of strain and deformation of the molding. Forming the molding to the glass also allows the molding to compensate for variation or dimensional irregularities of the glass. The showing of FIG. 2 is typical of all the bends around each of the windows.

Figure 3:
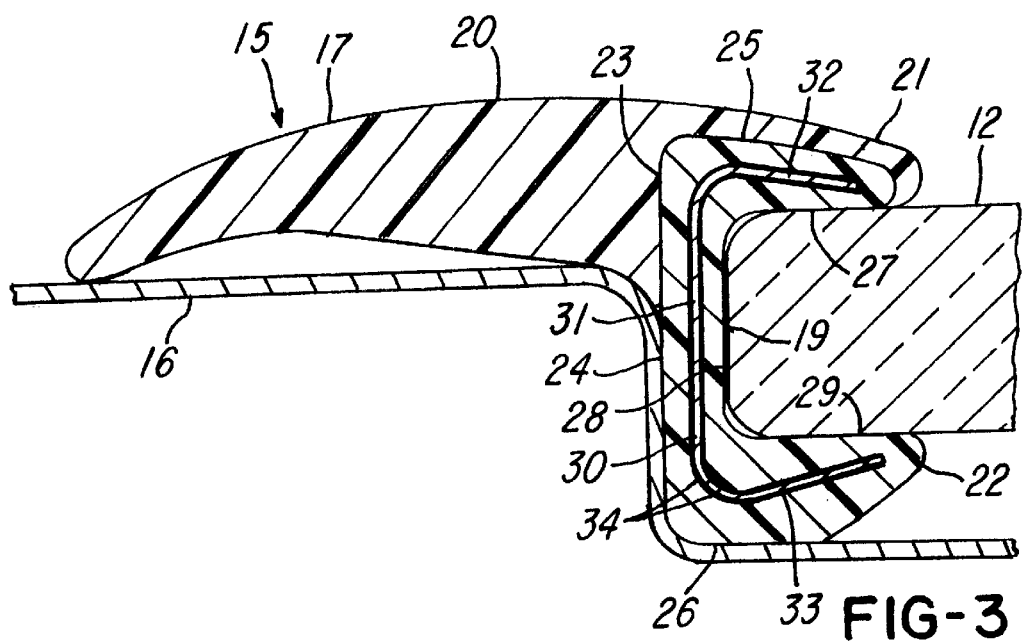
FIG. 3 is an enlarged sectional view taken along lines 3—3 of FIG. 1, illustrating the structure of a preferred form of the invention.

The cross-sectional view of FIG. 3 illustrates the construction of the novel molding 15, which is comprised of a principal body 20 made of a flexible elastomeric material, preferably a thermoplastic vulcanate (TPV), such as manufactured by D.S.M. Company, identified as DSM Sarlink 5765B4. This material is relatively soft, having a Shore A hardness between 60 and 80. The principal body has two spaced segments 21 and 22 which are opposite from and generally parallel to each other for retaining the window edge. These segments extend approximately at right angles to the body 20. The outer portion 17 which conceals the space extends from the edge of the body and lies against the body panel; this portion is made of the same material as the body. A layer 23 is partially embedded within the principal member and the segments, this layer being formed of a semi-rigid polyolefin which is harder than the primary material, having a Shore D hardness between 60 and 70. The material is preferably a rubber modified thermoplastic polyolefin (TPO), such as manufactured by A. Schulman Company and designated Schulman TTP 319E. The polyolefin may be of the polyethylene or polypropylene type, such as identified as Schulman PP1277-01, which may also be normal polyethylene (that is, not the rubber modified type). In the embodiment illustrated, the layer is generally U-shaped with a principal section 24 generally parallel to the body 20, and two generally parallel legs 25 and 26 extending approximately at right angles to section 24. Section 24 is partially embedded within the upper part of the body 20, and leg 25 is partially embedded within segment 21, while leg 26 is not similarly partially embedded. The inner surfaces 27, 28 and 29 extend beyond the embedded portions of the layer and contact the outer and end surfaces of the window. A layer of adhesives 9 has been placed on the edge of the window to bond with the surface 28 of the molding. It should be noted that in some modifications of the invention, the layer may be fully embedded within the body.

A reinforcement 30 is fully embedded within the layer 23, the reinforcement having a member 31 generally parallel to the body 20 and the section 24 of the layer. The reinforcement also has spaced generally parallel legs 32 and 33 which are embedded with the legs 25 and 26 of the layer. Legs 32 and 33 are angled inwardly toward each other and extend at an angle of between 60 and 90 degrees to the member 31. The reinforcement is made of a metallic material such as aluminum, and has a thickness of approximately 0.008 inch. Prior to assembly, the reinforcement is formed in a strip of material, coated with a thin layer of a suitable adhesive 34 which is compatible with polyolefins, usually a water-based adhesive system. The reinforcement is formed into the required shape as shown, and simultaneously assembled with the principal body and the layers by a co-extrusion process. The adhesive promotes adhesion of the reinforcement within the material of the layer. The legs of the reinforcement cooperate with the segments into which they are embedded to provide excellent retention of the window edge.

Figure 4:
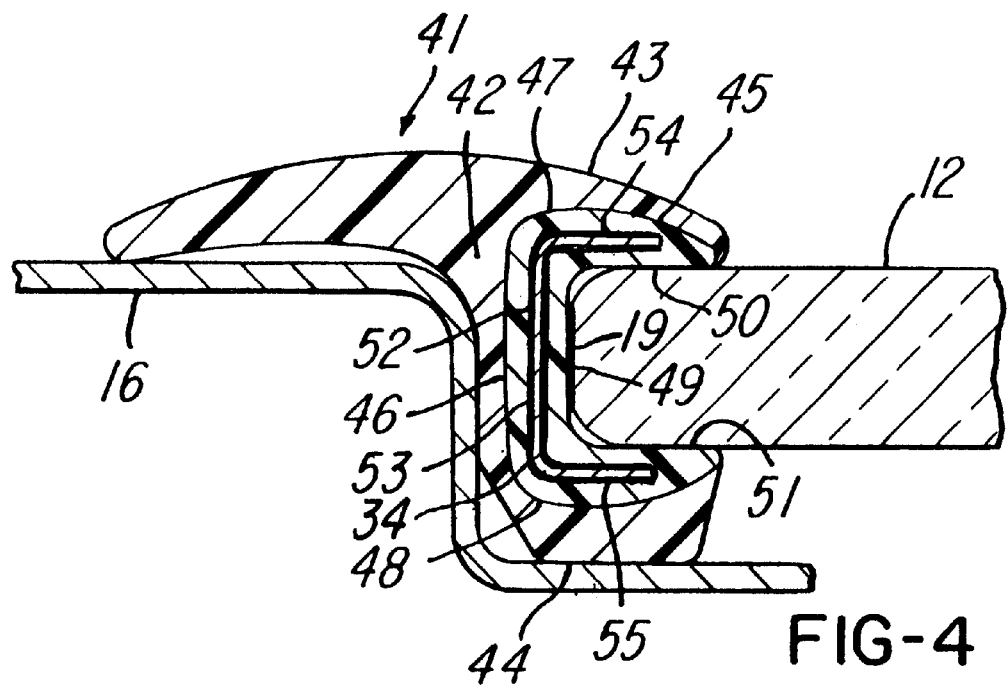
FIG. 4 is a view similar to FIG. 3, illustrating a modified form of the invention.

FIG. 4 illustrates a modified form of the invention showing a different configuration of the molding which embodies the same inventive concept. In this example, the molding 41 is comprised of a principal body 42, made of the same elastomer as body 20. Two spaced segments 43 and 44 extend at approximately right angles from the body, these segments being opposite from and parallel to each other for retaining the edge of the window. The layer 45 is formed of a harder elastomeric material, identical to that of layer 23, and is also U-shaped, and has a principal section 46 and legs 47 and 48 partially embedded within the body 42 and segments 43 and 44. The inner surfaces 49, 50 and 51 extend beyond the embedded portions, and contact the outer end surfaces of the window. If desired, the layer may be completely embedded. A reinforcement 52, made of the same material as reinforcement 30 and coated with the same adhesive 34, is also U-shaped and has a member 53 generally parallel to the body 42 and principal section 46 of the layer. The reinforcement also has generally parallel spaced legs 54 and 55 embedded within the segments 47 and 48. In this embodiment, the legs 54 and 55 are shown to extend at right angles to member 53, but may also be angled inwardly toward each other in the same manner as shown in FIG. 3, at an angle of 60 to 90 degrees relative to member 53. As in the earlier embodiment, the reinforcement cooperates with the layer to enhance the retention of the edges of the window. This molding is also preferably formed by a co-extrusion process. As in the first configuration, an adhesive 19 is placed on the edge of the window to bond with the surface 49 of the molding.

In both embodiments, a superior molding is produced by the combination of the soft elastomeric material of thermoplastic vulcanate, the harder semi-rigid polyolefin layer at least partially embedded within the body, and the adhesive coated aluminum reinforcement embedded within the layer. This is a product that is environmentally satisfactory. These embodiments are exemplary, and modifications thereof are contemplated within the spirit of the invention.

I claim:

1. In an automotive vehicle having a body panel and an adjacent window having an outer edge and a space between said body panel and said window edge, a window trim molding extending around at least a portion of said window edge between said body panel and said window edge including a portion contacting said body panel and concealing said space, said molding having a principal body comprising opposite segments spaced from and approximately parallel to each other for retaining said window edge; the improvement wherein said molding is primarily comprised of a first elastomeric material formed of a thermoplastic vulcanate, a layer of a second elastomeric material at least partially embedded within said principal body and said segments, said second elastomeric material, said second elastomeric material comprised of a semi-rigid polyolefin material harder than said first elastomeric material, and a reinforcement completely embedded within said layer for enhancing said retaining of said window edge.

2. The molding of claim 1 wherein said second elastomeric material is a rubber modified thermoplastic polyolefin.

3. The molding of claim 1 wherein said principal member and said segments have a generally U-shaped configuration, and said layer is continuous and has a configuration generally parallel to the configuration of said principal body and said segments.

4. The molding of claim 1 wherein said reinforcement is coated with an adhesive compatible with said second elastomeric material to improve bonding within said layer.

5. The molding of claim 1 wherein said reinforcement is continuous and has a configuration generally parallel to the configuration of said layer.

6. The molding of claim 1 wherein said reinforcement has a first member extending generally parallel to said principal body, and legs extending generally parallel to said segments.

7. The molding of claim 6 wherein said legs are angled inwardly toward each other at an angle of between 60 and 90 degrees to said first member.

8. In combination, an automotive vehicle having a body panel, an adjacent window having an outer edge and a space between said body panel and said window edge, and a window trim molding extending around at least a portion of said window edge including a portion contacting said body panel and concealing said space, said molding having a principal body comprising opposite segments spaced from and approximately parallel to each other for retaining said window edge; the improvement wherein said molding is primarily comprised of a first elastomeric material formed of a thermoplastic vulcanite, a layer of a second elastomeric material at least partially embedded within said principal body and said segments, said second elastomeric material comprised of a semi-rigid polyolefin material harder than said first elastomeriomaerial, and a reinforcement completely embedded within said layer for enhancing said retaining of said window edge.

9. The combination of claim 8 wherein said second elastomeric material is a rubber modified thermoplastic polyolefin.

10. The combination of claim 8 wherein said principal member and said segments of said molding have a generally U-shaped configuration, and said layer is continuous and has a configuration generally parallel to the configuration of said principal body and said segments.

11. The combination of claim 8 wherein said reinforcement is coated with an adhesive compatible with said second elastomeric material to improve bonding within said layer.

12. The combination of claim 10 wherein said reinforcement is continuous and has a configuration generally parallel to the configuration of said layer.

13. The combination of claim 8 wherein said reinforcement has a first member extending generally parallel to said principal body, and legs extending generally parallel to said segments.

14. The combination of claim 13 wherein said legs are angled inwardly toward each other at an angle of 60 to 90 degrees to said first member.

15. In an automotive vehicle having a body panel and an adjacent window having an outer edge and a space between said body panel and said window edge and a window trim molding around at least a portion of said window edge between said body panel and said window edge including a portion contacting said body panel and concealing said space, said molding having a principal body comprising opposite segments spaced from and approximately parallel to each other for retaining said window edge; the improved method of forming said molding of a first elastomeric material of a thermoplastic vulcanate, at least partially embedding a layer of a second elastomeric material comprised of a semi-rigid polyolefin material harder than said first elastomeric material within said principal body and said segments, and completely embedding a reinforcement within said layer and enhancing said retaining of said window edge.

16. The method of claim 15 including the further step of forming said second elastomeric material of a rubber modified thermoplastic polyolefin.

17. The method of claim 15 including the further steps of forming said segments in a U-shaped configuration, and forming said layer in a continuous member generally parallel to the configuration of said principal body and segments.

18. The method of claim 15 including the further steps of coating said reinforcement with an adhesive compatible with said second elastomeric material to improve bonding in said layer.

19. The method of claim 15 including the further step of forming said reinforcement as a continuous member generally parallel to the configuration of said layer.

20. The method of claim 15 including the further step of co-extruding said principal body, said layer, and said reinforcement to form a unitary structure.

\* \* \* \* \*